(12) United States Patent
Prabhu et al.

(10) Patent No.: US 9,207,907 B1
(45) Date of Patent: Dec. 8, 2015

(54) SYSTEMS AND METHODS FOR UPDATING SCHEDULES

(75) Inventors: Vinod Prabhu, Fremont, CA (US); Michael Robert Bourke, San Francisco, CA (US); Jason Fama, Redwood City, CA (US); Uri Peleg, Santa Clara, CA (US)

(73) Assignee: VERINT AMERICAS INC., Alpharetta, GA (US)

( * ) Notice: Subject to any disclaimer, the term of this patent is extended or adjusted under 35 U.S.C. 154(b) by 773 days.

(21) Appl. No.: 12/727,468

(22) Filed: Mar. 19, 2010

Related U.S. Application Data

(60) Provisional application No. 61/162,120, filed on Mar. 20, 2009.

(51) Int. Cl.
*G06F 3/048* (2013.01)
*G06F 7/06* (2006.01)
*G06Q 10/06* (2012.01)
*G06F 3/0481* (2013.01)

(52) U.S. Cl.
CPC ............... *G06F 7/06* (2013.01); *G06F 3/0481* (2013.01); *G06Q 10/06* (2013.01)

(58) Field of Classification Search
CPC ............. G06Q 10/06; G06F 7/00; G06F 7/06; G06F 7/32
USPC .......... 715/772, 963; 707/951; 705/7.13–7.26
See application file for complete search history.

(56) References Cited

U.S. PATENT DOCUMENTS

| | | | |
|---|---|---|---|
| 5,727,202 A * | 3/1998 | Kucala ................................. 1/1 |
| 7,039,596 B1 * | 5/2006 | Lu ................................. 705/7.13 |
| 2002/0184321 A1 * | 12/2002 | Fishman et al. .............. 709/206 |
| 2006/0190313 A1 * | 8/2006 | Lu ..................................... 705/8 |
| 2007/0220063 A1 * | 9/2007 | O'Farrell et al. ............. 707/201 |
| 2012/0054683 A1 * | 3/2012 | Sands et al. ................... 715/825 |

* cited by examiner

*Primary Examiner* — Dino Kujundzic
(74) *Attorney, Agent, or Firm* — Meunier Carlin & Curfman

(57) ABSTRACT

Disclosed is a method of creating and updating schedules. The method comprises receiving a plurality of initial events associated with a plurality of entities, generating an initial schedule that identifies the plurality of initial events, receiving a plurality of subsequent events, processing each initial event of the plurality of initial events to identify a subset of the plurality of initial events that should be maintained based on which entity of the plurality of entities is associated with the initial event, and generating an updated schedule that identifies only the subset of the plurality of initial events and the plurality of subsequent events.

19 Claims, 8 Drawing Sheets

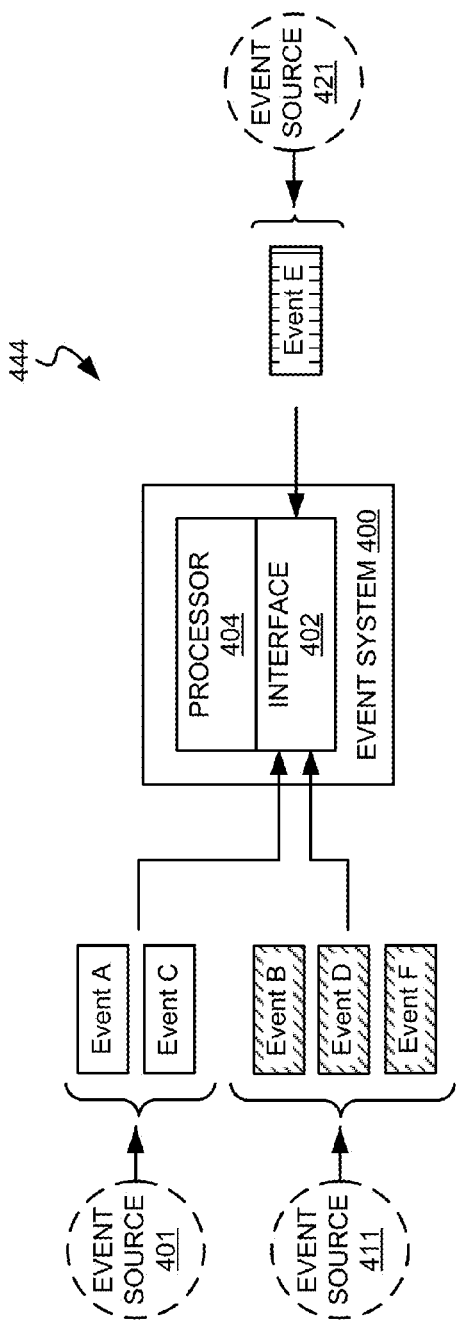
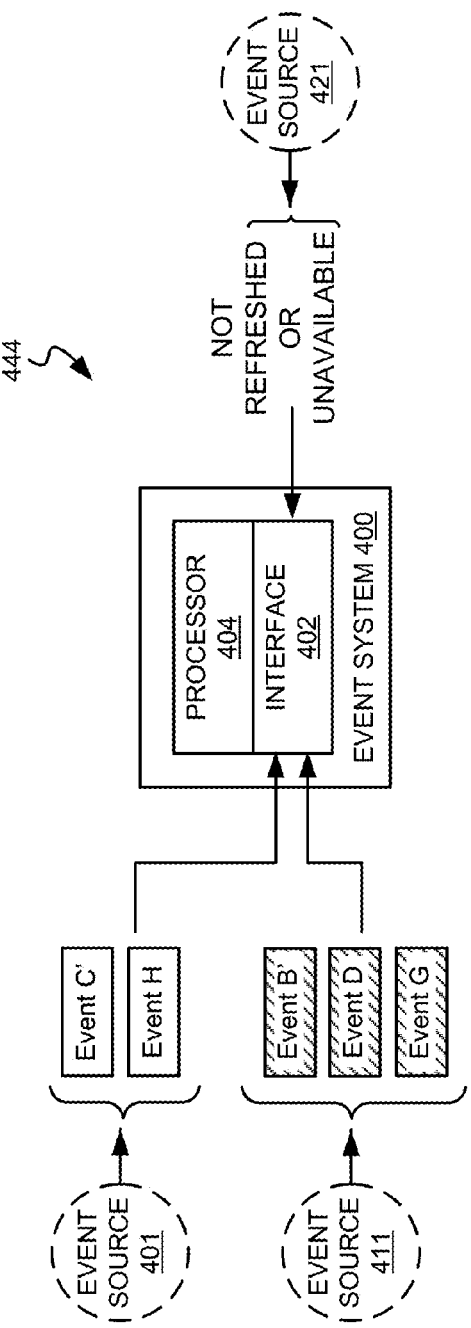
FIGURE 4A
FIGURE 4B

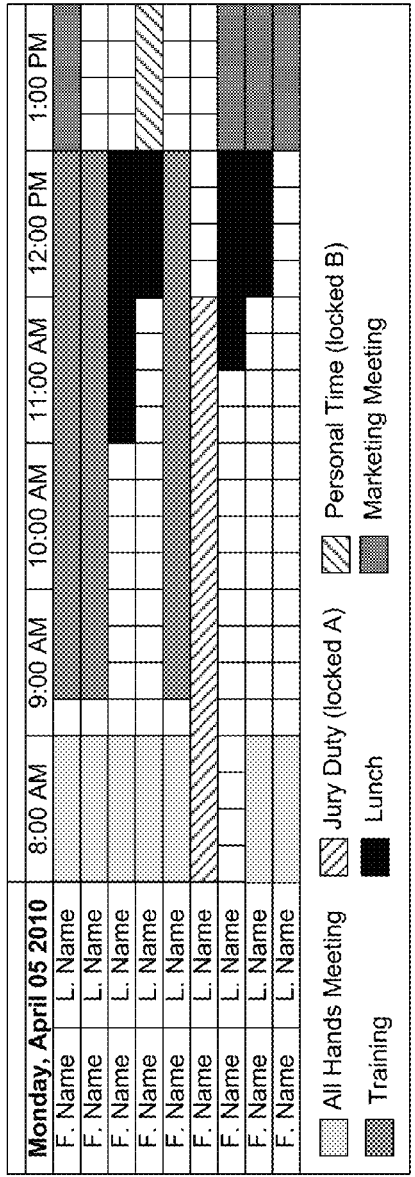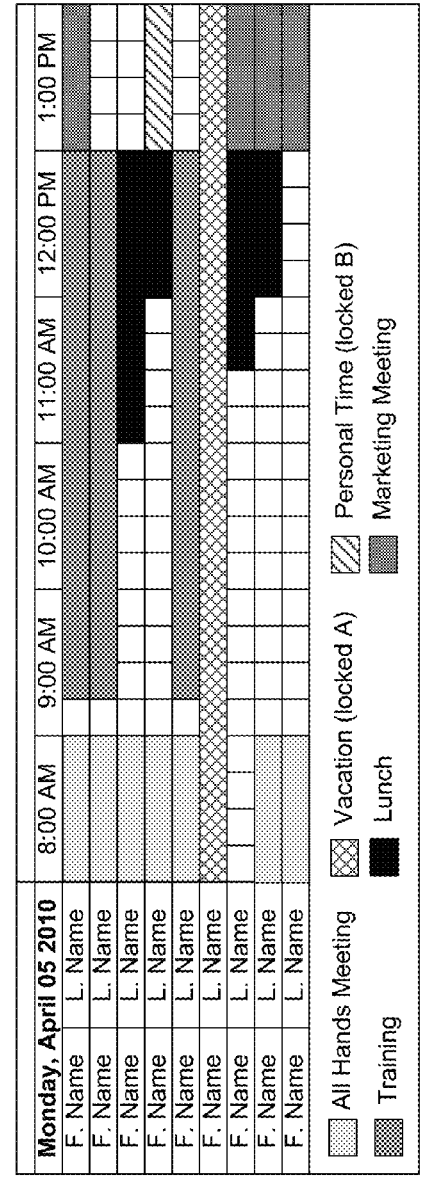
FIGURE 8A
FIGURE 8B

SYSTEMS AND METHODS FOR UPDATING SCHEDULES

RELATED APPLICATIONS

This application is related to and claims priority to U.S. Provisional Patent Application No. 61/162,120, entitled "Systems and Methods for Synchronizing Schedule Information," filed on Mar. 20, 2009, and which is hereby incorporated by reference in its entirety.

TECHNICAL FIELD

Aspects of the invention are related, in general, to the field of scheduling, and more specifically, to synchronizing and updating a schedule.

TECHNICAL BACKGROUND

Scheduling and calendar systems are widely available. Such systems are often used to create and display appointments and events, organize and display meetings, and create and view group schedules. A variety of calendar and event management systems exist to perform these functions. For instance, calendar management systems such as desk top and web based calendars will store meetings and appointments, human resource systems will store time off and vacation hours, and eLearning systems will store a training schedule. In many instances, importing, managing, and presenting activities from different systems in a unified view can be achieved and improved.

Overview

Disclosed are systems and methods for creating and updating a schedule of events. In an embodiment, a method comprises receiving a plurality of initial events associated with a plurality of entities, generating an initial schedule that identifies the plurality of initial events, receiving a plurality of subsequent events, processing each initial event of the plurality of initial events to identify a subset of the plurality of initial events that should be maintained based on which entity of the plurality of entities is associated with the initial event, and generating an updated schedule that identifies only the subset of the plurality of initial events and the plurality of subsequent events.

In an embodiment, the plurality of entities comprise a primary event system and a secondary event system.

In an embodiment, the subset of the plurality of events are associated with the primary event system.

In an embodiment, a remainder of the plurality of events not including the subset of the plurality of events are associated with the secondary event system.

In an embodiment, the entity comprises a source of the initial event.

In an embodiment, the method further comprises locking the initial event based on the source of the initial event.

In an embodiment, the source of the initial event comprises a computer application that generated the initial event.

In an embodiment, the source of the initial event comprises a user that generated the initial event.

In an embodiment, the method further comprises transferring the updated schedule to at least one of the plurality of entities.

In another embodiment, an event system for creating and updating schedules is disclosed. The even system comprises an interface configured to receive a plurality of initial events associated with a plurality of entities and receive a plurality of subsequent events, and a processor configured to generate an initial schedule that identifies the plurality of initial events, process each initial event of the plurality of initial events to identify a subset of the plurality of initial events that should be maintained based on which entity of the plurality of entities is associated with the initial event, and generate an updated schedule that identifies only the subset of the plurality of initial events and the plurality of subsequent events.

In another embodiment, a computer readable medium having program instructions stored thereon for creating and updating schedules is disclosed. The computer readable medium, when executed by an event system, direct the event system to receive a plurality of initial events associated with a plurality of entities, generate an initial schedule that identifies the plurality of initial events, receive a plurality of subsequent events, process each initial event of the plurality of initial events to identify a subset of the plurality of initial events that should be maintained based on which entity of the plurality of entities is associated with the initial event, and generate an updated schedule that identifies only the subset of the plurality of initial events and the plurality of subsequent events.

BRIEF DESCRIPTION OF THE DRAWINGS

FIG. 4A and FIG. 4B illustrates an event system for creating and updating schedules according to an embodiment.

FIG. 8A and FIG. 8B illustrate an initial and updated schedule according to an embodiment.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
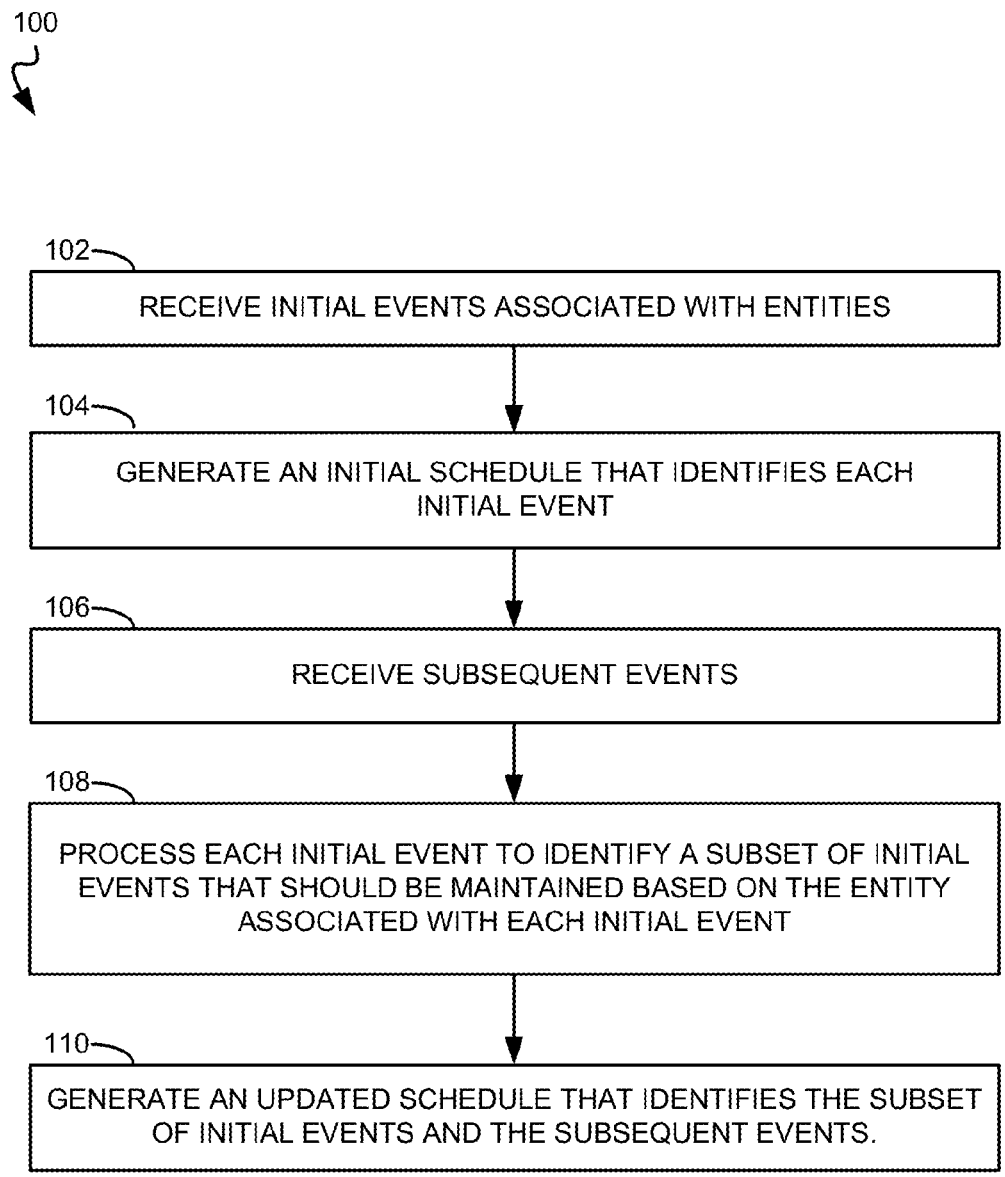
FIG. 1 illustrates creating and updating a schedule events according to an embodiment.

FIG. 1 illustrates a process 100 for creating and updating a schedule of events. The events may contain schedule information and other items used to create and display appointments and other happenings, organize and display meetings, and create and view group schedules. The events may be in a number of formats and received from a number of systems. For example, events may be received from calendar management systems such as desktop and web based calendars, human resource systems, and eLearning systems.

To begin, initial events associated with entities are received (Step 102). An initial schedule that identifies each initial event is then generated (Step 104). Subsequent events are then received (Step 106). Each initial event is then processed to identify a subset of the initial events that should be maintained based on the entity associated with each initial event (Step 108). Lastly, an updated schedule is generated that identifies the subset of initial events and the subsequent events (Step 110).

Figure 2:
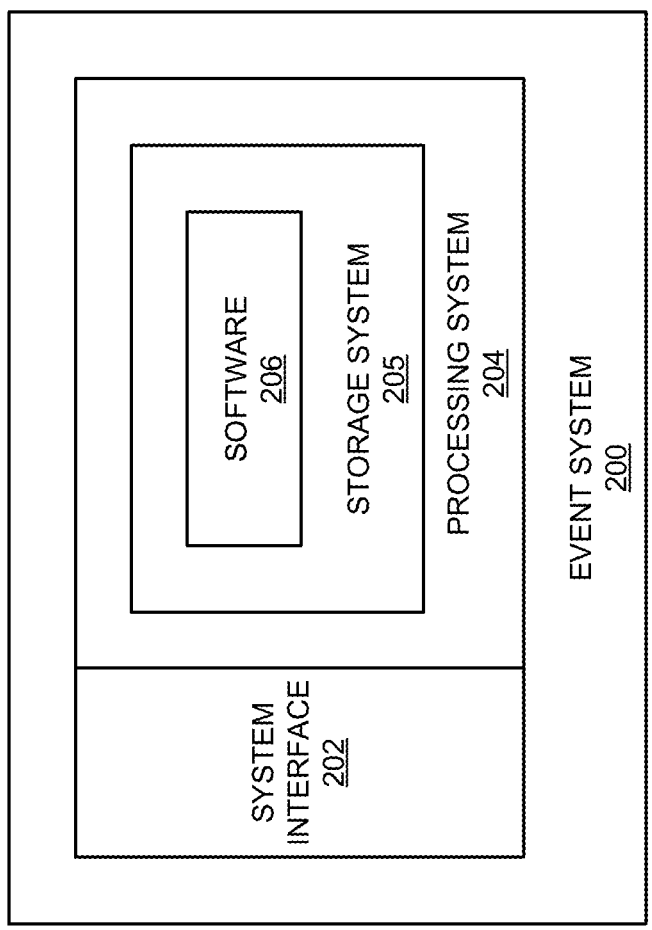
FIG. 2 illustrates an event system for creating and updating schedules according to an embodiment.

FIG. 2 illustrates event system 200 in an embodiment whereby software 206 is implemented in the event system in order to perform process 100. Event system 200 includes system interface 202, processing system 204, storage system 205 and software 206. Processing system 204 is linked to system interface 202. Software 206 is stored on storage system 205.

System interface 202 may comprise a communication interface and a user interface. In this case, the communication interfaces comprises a network card, network interface, port, or interface circuitry that allows event system 200 to communicate with a storage system. The communication interface may also include a memory device, software, processing circuitry, or some other communication device. The communication interface may use various protocols, such as host bus adapters (HBA), SCSI, SATA, Fibre Channel, iSCI, WiFi, Ethernet, TCP/IP, or the like to communicate with a storage system.

The user interface may comprise components that interact with a user to receive user inputs and to present media and/or information. The user interface may include a speaker, microphone, buttons, lights, display screen, mouse, keyboard, or some other user input/output apparatus—including combinations thereof. The user interface may be omitted in some embodiments.

Processing system 204 may comprise a microprocessor and other circuitry that retrieves and executes software 206 from storage system 205. Storage system 205 comprises a disk drive, flash drive, data storage circuitry, or some other memory apparatus. Processing system 204 is typically mounted on a circuit board that may also hold storage system 205 and portions of system interface 202.

Software 206 comprises computer programs, firmware, or some other form of machine-readable processing instructions. Software 206 may include an operating system, utilities, drivers, network interfaces, applications, virtual machines, or some other type of software. When executed by processing system 204, software 206 directs processing system 204 to operate event system 200 as described herein.

In operation, processing system 204 executes software 206 to configure event system 200 to receive events and create and update a schedule. The initial events are received by event system 200 via system interface 202. Each initial event is associated with an entity. The initial events may be, for example, associated with event system 200, other event systems, software applications, or users. Processing system 204, executing software 206, generates an initial schedule that identifies each event.

In this example, event system 200 receives subsequent events. Like the initial events, the subsequent events may be received via system interface 202 and may be associated with event system 200, other event systems, software applications, or other users. Processing system 204, executing software 206, then processes each initial event in order to identify a subset of the initial events that should be maintained based on the entity associated with each initial event. Lastly, processing system 204 generates an updated schedule that identifies the subset of the initial events and the subsequent events.

Figure 3:
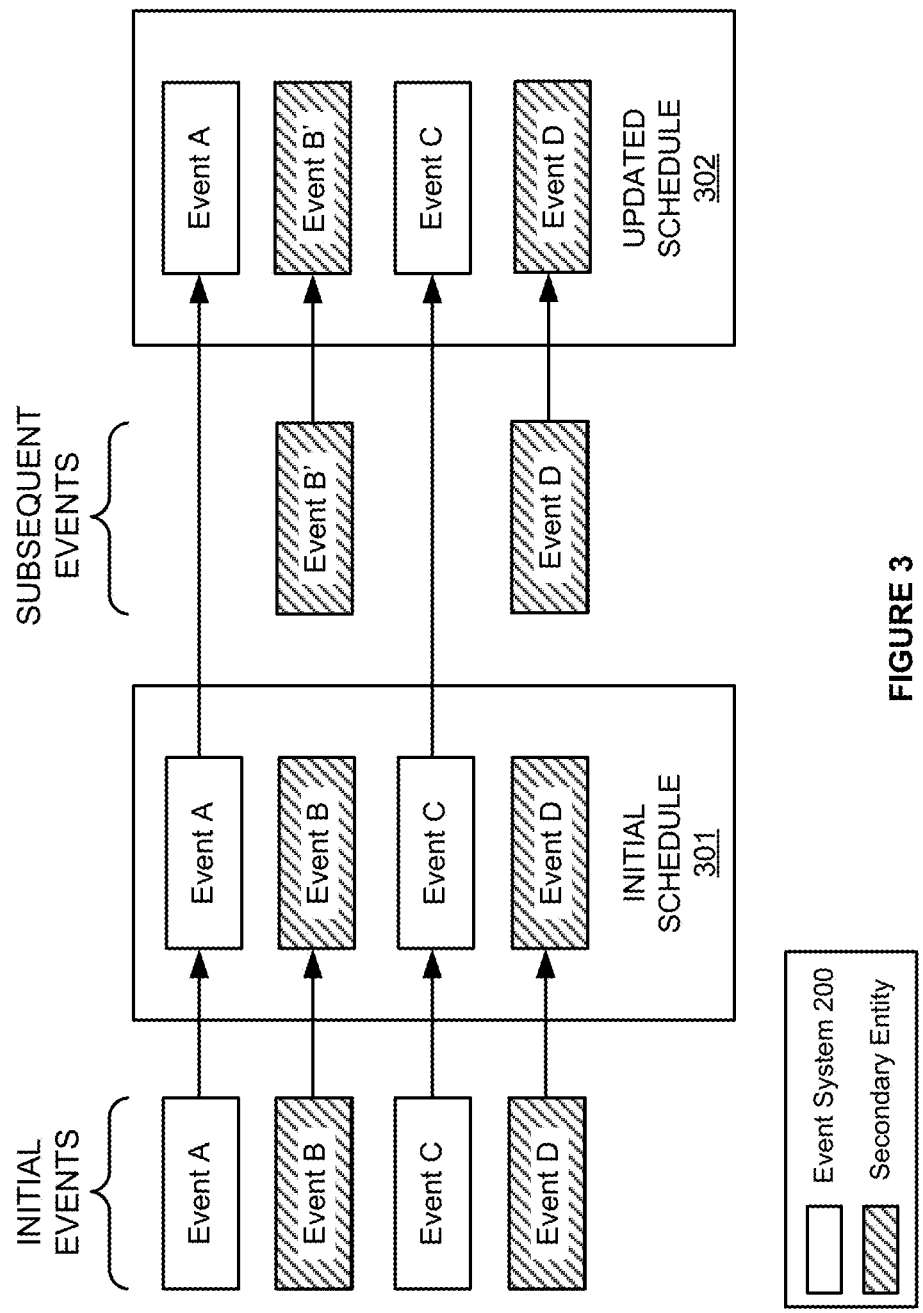
FIG. 3 illustrates operation of an event system according to an embodiment

FIG. 3 illustrates operation of event system 200 in an embodiment for creating and updating a schedule of events.

In this example, event system 200 receives initial events A, B, C, and D. Event system 200 may receive these initial events at system interface 202. Each initial event A, B, C, and D has an entity associated with it. The entity associated with the event may be, for example, event system 200.

Entities may also be associated with a primary or a secondary entity (i.e., an entity other than the primary entity). For example, a secondary entity may be the entity that transmitted the initial event to the primary entity.

Referring again to FIG. 3, events associated with event system 200 are shown not shaded. Events associated with a secondary entity are shown with cross-shading. In this example, initial events A and C are not shaded, and thus, are associated with event system 200. Event system 200 is the primary entity. Initial events B and D are cross-shaded in order to illustrate an association between the initial events B and D and the secondary entity.

Once initial events A, B, C, and D are received, event system 200 generates initial schedule 301. Initial schedule 301 identifies each initial event. Subsequent events B' and D are then received by event system 200. Subsequent events B' and D are associated with the secondary entity, and thus, are shown with cross-shading.

Once subsequent events B' and D are received, event system 200 proceeds to process each initial event to identify a subset of the initial events that should be maintained based on the entity associated with the initial event. In this example, events associated with event system 200 (initial events A and C) comprise the subset of initial events that should be maintained. The initial events associated with the secondary entity are removed from the updated schedule.

After determining the subset of initial events that should be maintained, event system 200 generates an updated schedule 302 that identifies the subset of initial events and the subsequent events.

FIG. 4A and FIG. 4B illustrate event synchronization system 444 in a sequence whereby software executed on processor 404 is implemented in order to create and update a schedule of events. FIG. 4A illustrates event system 400 receiving initial events from various sources and creating an initial schedule of events. FIG. 4B illustrates event system 400 receiving subsequent events from the same sources and creating an updated schedule.

In this example, synchronization system 444 includes event system 400, event source 401, event source 411, and event source 421. Three event sources are shown for simplicity. Those skilled in the art will appreciate that synchronization system 444 may contain more or fewer event sources.

Event system 400 may be any computer system, custom hardware, or other device configured to receive and maintain a schedule of events. Processor 404 may comprise a microprocessor and other circuitry that executes software from a storage system. The storage system may comprise a disk drive, flash drive, data storage circuitry, or some other memory apparatus. Processor 404 is typically mounted on a circuit board that may also hold the storage system and portions of interface 402. When executed, the software directs processor 404 to receive the events via interface 402 and to create and update a schedule of events from a variety of sources.

Interface 402 may comprise a communication interface and a user interface. In this case, the communication interfaces may comprise a network card, network interface, port, or interface circuitry that allows event system 400 to communicate with a storage system. The communication interface may also include a memory device, software, processing circuitry, or some other communication device. The communication interface may use various protocols, such as host bus adapters (HBA), SCSI, SATA, Fibre Channel, iSCI, WiFi, Ethernet, TCP/IP, or the like to communicate with a storage system.

The user interface may comprise components that interact with a user to receive user inputs and to present media and/or information. The user interface may include a speaker, microphone, buttons, lights, display screen, mouse, keyboard, or some other user input/output apparatus—including combinations thereof. The user interface may be omitted in some embodiments.

Interface 402 is configured to receive events from event source 401, event source 411, and event source 421. Event sources 401, 411, and 421 are connected to event system 400 via links that may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, or any other communication protocols and formats, including combinations thereof.

In this example, the initial events may be associated with an entity based on the source of the event. In some cases, the entity associated with the event may comprise the event source. An event source, such as event source 401, 411, and 421, may be, for example, an event system, a software application, or a user directing an event system or software application. It should be understood that the user may be a human operator, as well as other software applications, hardware elements, or the like.

Both primary and secondary event sources are illustrated. A primary event source generates events that are to be primarily maintained in event system 400. These events can only be modified by a user of event system 400 and may only be obtained in other event systems if they are exported to those systems. Again, it should be understood that the user may be a human operator, as well as other software applications, hardware elements, or the like. In one example, a user of event system 400 may comprise a primary event source when operating software on system 400 either directly through a peripheral device or remotely via a personal computer (PC) or other mobile device with access to event system 400.

Figure 5:
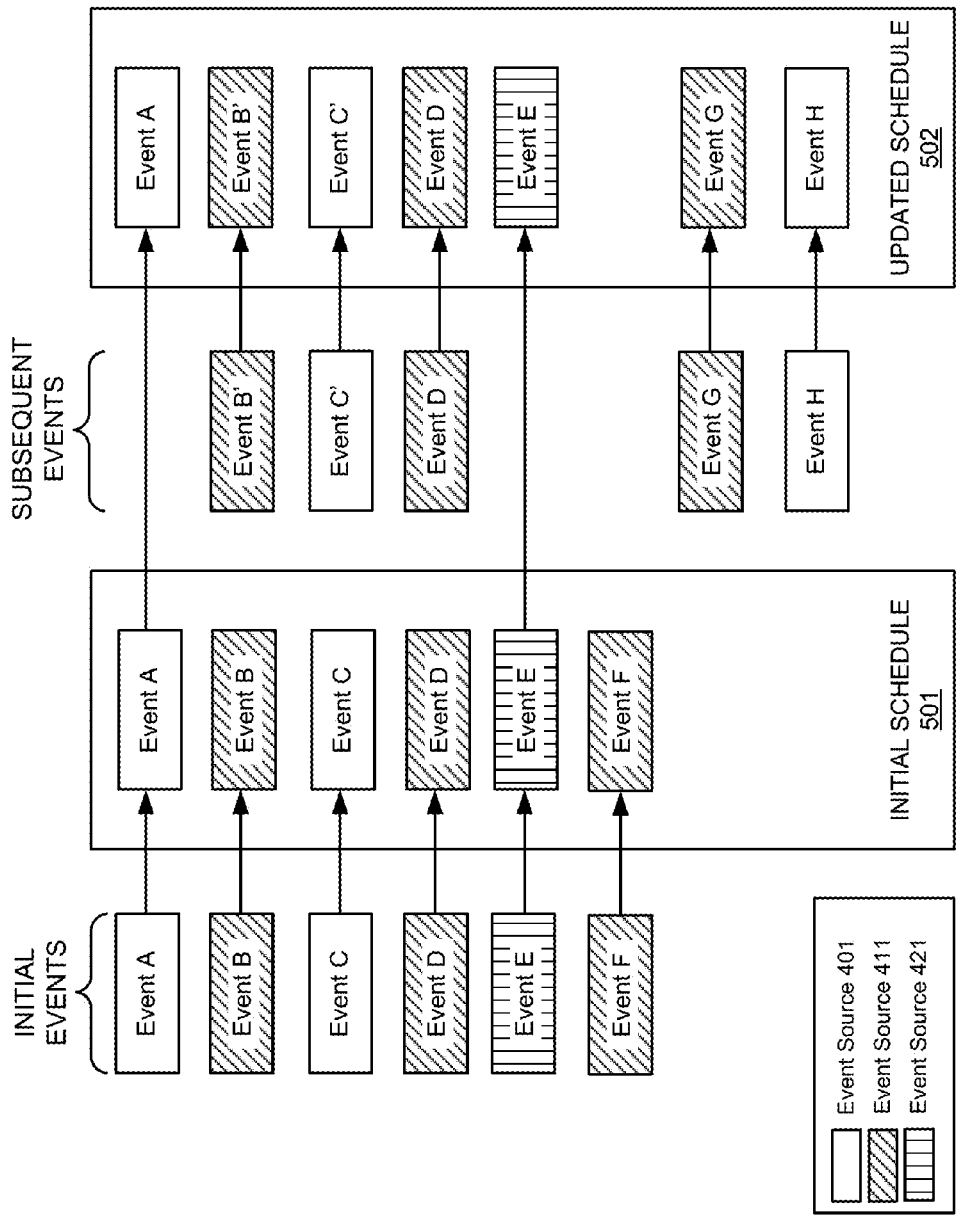
FIG. 5 illustrates operation of an event system for creating and updating schedules according to an embodiment.

FIG. 5 illustrates operation of event system 400 in an embodiment for creating and updating a schedule of events. FIG. 5 is described with reference to FIG. 4A and FIG. 4B.

FIG. 4A illustrates event system 400 receiving initial events A, B, C, D, E, and F. Event system 400 may receive these initial events at system interface 402. Each initial event A, B, C, D, E, and F has an entity associated with it. As discussed above, the entity associated with each initial event may be, for example, the event source.

In synchronization system 444, event source 401 is a primary event source. Initial events associated with the primary source 401 are shown without shading (initial events A and C). Events associated with secondary event source 411 are shown with cross-shading (initial events B, D, and F). Events associated with secondary event source 421 are shown with vertical-shading (initial event E). Once the initial events A, B, C, D, E, and F are received, event system 400 generates initial schedule 501 which identifies each initial event.

FIG. 4B illustrates event system 400 receiving subsequent events B', C', D, G, and H. Event system 400 may receive these initial events at the system interface 402. Each initial event B', C', D, G, and H has an entity associated with it.

In synchronization system 444, event sources 411 and 421 are secondary event sources. Subsequent events associated with the primary source 401 are shown without shading (subsequent events C' and H). Events associated with secondary event source 411 are shown with cross-shading (initial events B', D, and G). In this case, there are no subsequent events associated with secondary event source 421 because event source 421 is not refreshed.

Subsequent event B' is an updated version of initial event B, subsequent event C' an updated version of initial event C, subsequent event D is a refreshed version of initial event D, and subsequent events G and H are new events.

Upon reception of the subsequent events, event system 400 proceeds to process each initial event to identify a subset of the initial events that should be maintained based on the entity associated with the initial event. In this example, events associated with event source 401 (the primary event source) should be maintained unless the subsequent event is received that updates the initial event. In this case, initial event A is maintained, however, initial event C is not be maintained because subsequent event C' is an updated version of the initial event C.

Furthermore, in some embodiments, if an event source is not refreshed or is unavailable, then the events associated with that event source are also maintained. FIG. 4B illustrates that a subsequent event may not be available from event source 421. A subsequent event may be unavailable for any number of reasons. For example, a connection between event system 400 and event source 421 may not be established. Alternatively or additionally, event system 400 may purposefully not refresh events from a particular event source.

In this example, initial events associated with event source 421 (i.e., initial event E) are maintained in addition to those initial events associated with event source 401. Thus, in this example, the subset of initial events that should be maintained are initial events A and E.

After determining the subset of initial events that should be maintained, event system 400 generates an updated schedule 502 that identifies the subset of initial events and the subsequent events.

Figure 6:
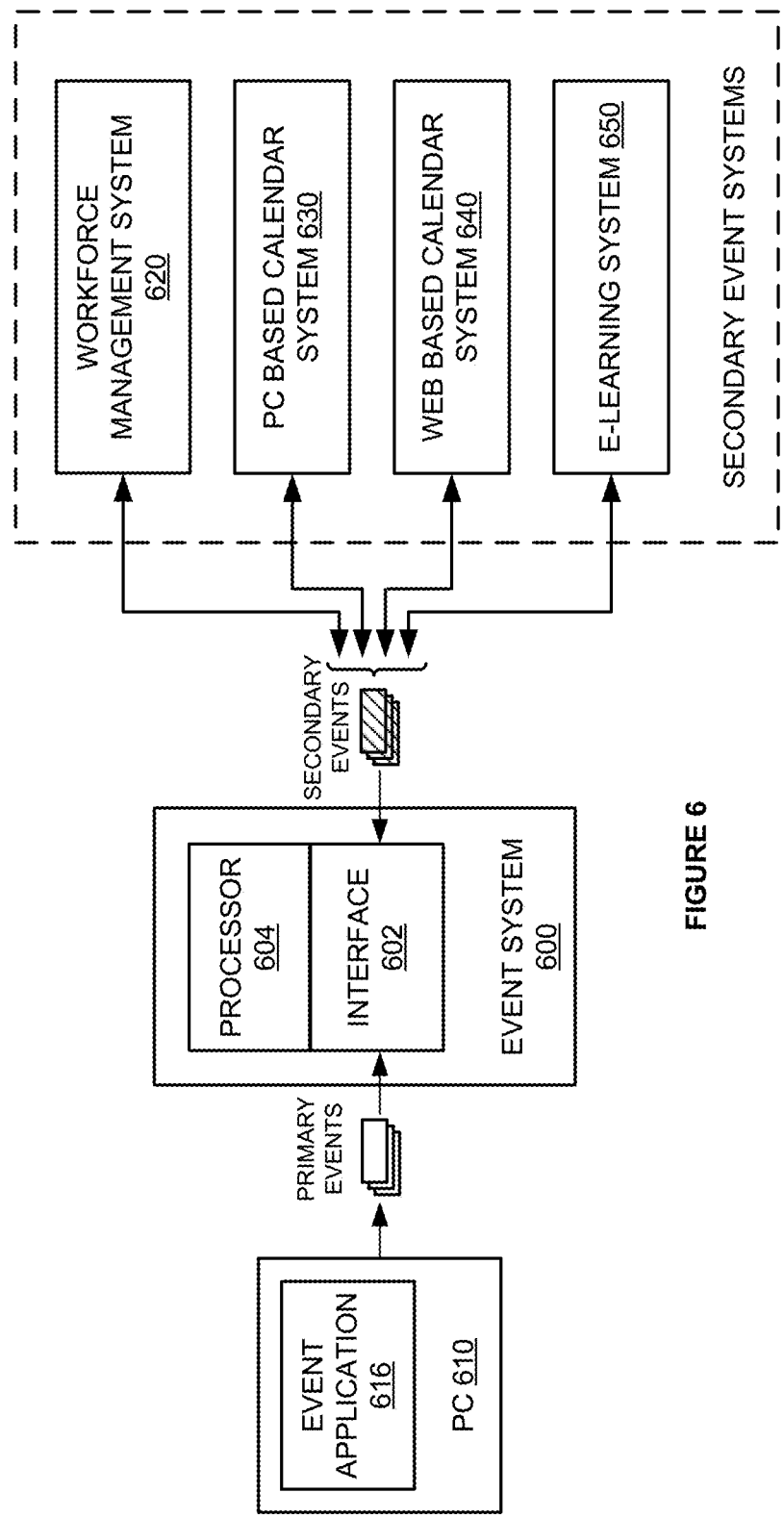
FIG. 6 illustrates an event system for creating and updated schedules according to an embodiment

FIG. 6 illustrates event system 600 in another embodiment whereby software executed on processor 604 is implemented to receive initial and subsequent events associated with primary and secondary event systems and generate an initial and a subsequent schedule of events.

Event system 600 may be any computer system, custom hardware, or other device. Processor 604 may comprise a microprocessor and other circuitry that executes the software from a storage system. Event system is configured to receive primary events from PC 610.

Interface 602 may comprise a communication interface and a user interface. In this case, the communication interfaces may comprise a network card, network interface, port, or interface circuitry that allows event system 600 to communicate with a storage system. The communication interface may also include a memory device, software, processing circuitry, or some other communication device. The communication interface may use various protocols, such as host bus adapters (HBA), SCSI, SATA, Fibre Channel, iSCI, WiFi, Ethernet, TCP/IP, or the like to communicate with a storage system.

The user interface may comprise components that interact with a user to receive user inputs and to present media and/or information. The user interface may include a speaker, microphone, buttons, lights, display screen, mouse, keyboard, or some other user input/output apparatus—including combinations thereof. The user interface may be omitted in some embodiments.

Primary events are initial and/or subsequent events associated with event system 600 or generated by PC 610 (a primary event source) executing event application 616. Those skilled in the art will appreciate that PC 610 may be a personal data assistant (PDA), a mobile or smart phone, or any other device capable of executing event application 616. Event application 616 may comprise computer programs, firmware, or some other form of machine-readable processing instructions. When executed by PC 610, event application 616 directs PC 610 to generate primary initial and subsequent events as described herein.

Secondary event systems are configured to transmit secondary events to event system 600. The secondary events may be received in a number of formats. For instance, events may be received from a number of event systems including calendar management systems such as desktop and web based calendars, human resource systems, and eLearning systems. In this example, four secondary event systems are shown for simplicity. Those skilled in the art will appreciate that some embodiments will include more or less secondary event systems.

As shown, secondary event systems may include workforce management system 620, PC based calendar system 630, web-based calendar system 640 and eLearning system 650. Workforce management system 620 may be any human resources system capable of storing initial and/or subsequent events related to, for example, time off and/or vacation hours of employees.

PC based calendar system 630 may be a any PC-based calendar management system, such as Microsoft Outlook, capable of generating initial and/or subsequent events generally related to calendar and event management.

Web based calendar system 640 may be any web-based calendar or scheduler, for example, a Google calendar web-server capable of generating initial and/or subsequent events generally related to calendar and event management.

eLearning system 650 may be any eLearning system such as, for example, Abobe, capable of storing initial and/or subsequent events related to a training schedule.

Figure 7:
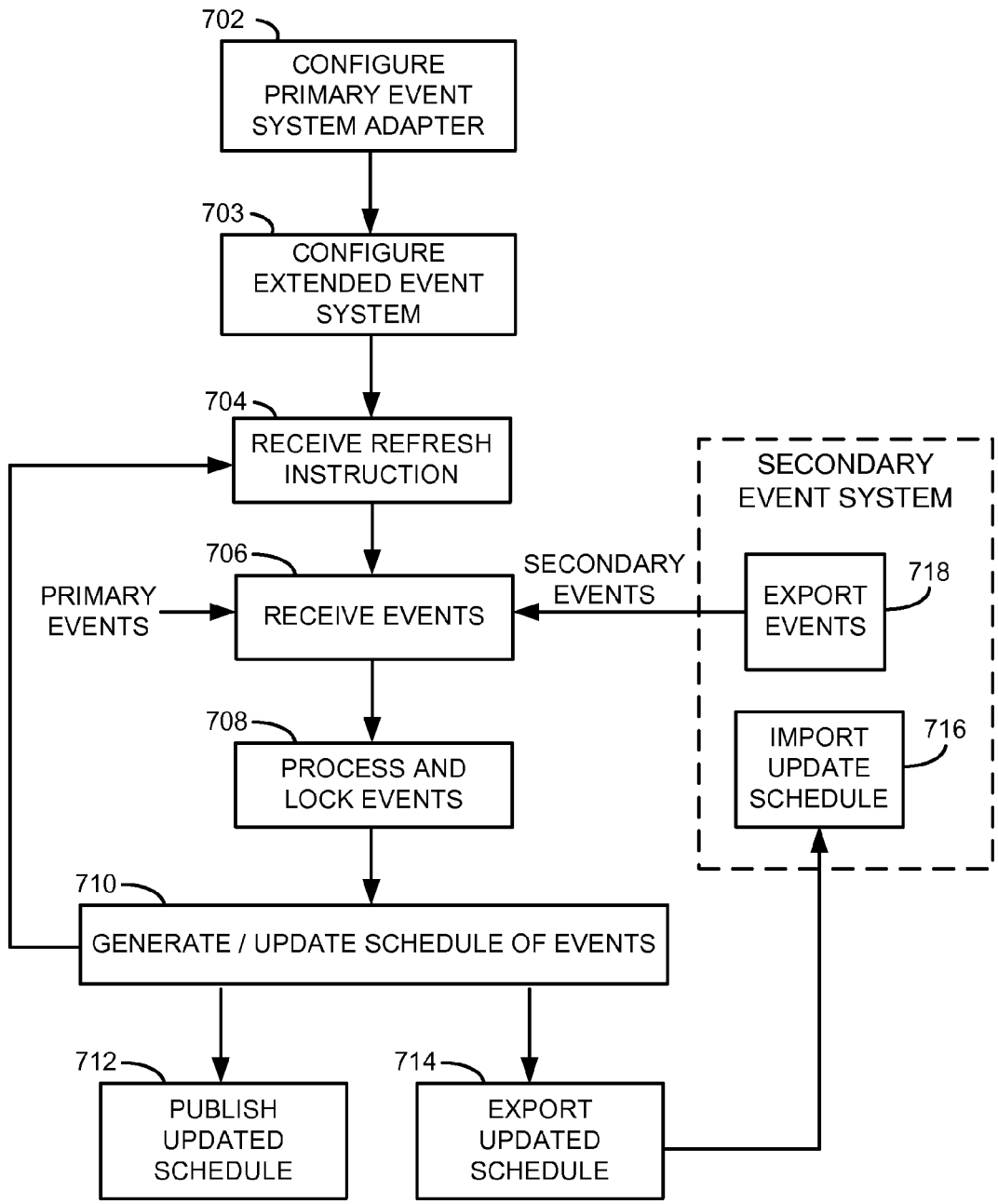
FIG. 7 illustrates operation of an event system for creating and updating schedules according to an embodiment.

FIG. 7 illustrates operation of event system 600 when executing software for creating and updating a schedule of events. In this example, event application 616 includes a primary event system adapter that is configured by a user (Step 702). A secondary event system may then be configured (Step 703). As previously discussed, a secondary event system may be, for example, any one of workforce management system 620, PC based calendar system 630, web-based calendar system 640, or eLearning system 650.

A refresh instruction is then triggered (Step 704). In response to the refresh instruction, primary events may be received from a primary source (i.e., PC 610) and secondary events may be received from a secondary source (i.e., secondary event system such as export events operation 718) (Step 706). In this case, primary events are associated with event system 600 and secondary events are associated with the secondary event system.

Event system 600 processes the received events and locks the events based on the associated entity (Step 708). Primary events associated with event system 600 are considered owned by event system 600. Secondary events associated with a secondary event system are considered owned by that secondary event system and may be locked when received. An event that is locked can only be modified, edited, updated, or deleted by receiving a subsequent event from the same associated entity.

If event system 600 has previously generated a schedule (i.e, Step 710 already executed at least once) then each initial event is also processed to identify a subset of the initial events that should be maintained based on the entity associated with each initial event.

An updated schedule is then generated/updated (Step 710). The previously generated schedule is updated if Step 710 has already been performed at least once. Otherwise, an initial schedule is generated. Event system 600 then waits to receive another refresh instruction.

Additionally, event system 600 publishes an updated schedule (712). In this way activities from multiple event systems can be viewed in a unified view. Event system may also optionally export the updated schedule to the secondary event system (Step 714). The updated schedule may be exported automatically or may be requested by a secondary event system. The secondary event system may then import the updated schedule (Step 716).

FIG. 8A and FIG. 8B illustrate schedule 822 in a sequence whereby subsequent events are received by an event system and schedule 822 is updated. The event system may be any event system such as, for example, event system 200 (FIG. 2), event system 400 (FIG. 4), or event system 600 (FIG. 6).

Schedule 822 may include the date, names of employees, and various events that are scheduled for those employees. In this example, the date is displayed as "Monday, Apr. 5, 2010" and indicates the date of the schedule (i.e., the date events on the schedule are to be completed). As shown, schedule 822 displays each employee name with the first name (F. Name) followed by the last name (L. Name). Those skilled in the art will appreciated that other identifiers and/or formats may be used to identify each employee. For example, employee numbers may be used in addition to or in lieu of the employee's name.

Referring now to FIG. 8A, which illustrates an initial schedule. Six events are shown for simplicity. Those skilled in the art will appreciate that more or fewer events may be displayed. In this example, an all hands meeting is shown scheduled from 8:00 AM to 9:00 AM. This event is not shaded, and thus, owned by the primary event system (i.e., the event system displaying the schedule). Several other events are also owned by the primary event system. For example, a training event is scheduled from 9:15 AM to 1:00 PM, lunch events are scheduled at various times, and a marketing meeting is scheduled from 1:00 PM to 2:00 PM. Because these events are owned by the primary event system, an operator of the primary event system may modify, edit, or delete these events.

In addition, schedule 822 includes several events owned by secondary event systems. For example, one employee is scheduled for jury duty from 8:00 AM to 12:00 PM. This event is owned by another entity—for example, a secondary event system. As such, the Jury duty event is shown with cross-shading and displayed as "locked A" indicating that the Jury duty event is owned by entity A. Because entity A owns this event, only entity A may modify, edit, or delete the event. Thus, the Jury duty event may be modified if the primary event system refreshes events from Entity A. Schedule 822 also includes a personal time event owned by Entity B.

Referring now to FIG. 8B, which illustrates an updated schedule. In this example, the primary event system refreshed events from entities A and B. Entity B refreshed the personal time event with no changes. However, when entity A is refreshed, the Jury Duty event is deleted and a Vacation event is included. The Vacation event is locked and displayed in the updated schedule. In this way, an event may be modified on another system and displayed in a unified view on the primary event system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of creating and updating schedules, the method comprising:
   receiving, by a processor, a plurality of initial events associated with a plurality of entities;
   generating, by the processor, an initial schedule in a single calendar that includes the plurality of initial events;
   receiving, by the processor, a plurality of subsequent events;
   applying, by the processor after receiving the plurality of subsequent events, selection criteria to each initial event of the plurality of initial events to identify a subset comprising all initial events of the plurality of initial events that satisfy the selection criteria and are, therefore, to be kept within the single calendar;
   the applying, wherein a consequence of at least one criterion of the selection criteria applied to each initial event depends on the identity of the entity of the plurality of entities associated therewith; and
   generating, by the processor, an updated schedule in the single calendar that includes the subset of the plurality of initial events and the plurality of subsequent events and does not include initial events of the plurality of initial events not included within the subset of the plurality of initial events.

2. The method of claim 1 wherein the plurality of entities comprises a primary event system and a secondary event system.

3. The method of claim 2 wherein each initial event of the subset of the plurality of initial events is associated with the primary event system.

4. The method of claim 1 wherein all initial events of the plurality of initial events not included within the subset of the plurality of initial events are associated with the secondary event system.

5. The method of claim 1 wherein a first entity of the pluralities of entities comprises a source of a first initial event of the plurality of initial events.

6. The method of claim 5 further comprising locking the first initial event so that the first initial event can only be modified by the first entity providing, to the processor, a first subsequent event comprising a modified version of the first initial event.

7. The method of claim 5, wherein the source of the first initial event comprises a computer application that generated the first initial event.

8. The method of claim 5 wherein the source of the first initial event comprises a user that generated the first initial event.

9. The method of claim 1 further comprising transferring the updated schedule to at least one entity of the plurality of entities.

10. An event system for creating and updating schedules, the system comprising:
    an interface configured to
       receive a plurality of initial events associated with a plurality of entities and
       receive a plurality of subsequent events; and
    a processor configured to
       generate an initial schedule in a single calendar that includes the plurality of initial events,
       apply, after receiving the plurality of subsequent events, selection criteria to each initial event of the plurality of initial events to identify a subset comprising all initial events of the plurality of initial events that satisfy the selection criteria and are, therefore, to be kept within the single calendar,
       wherein a consequence of at least one criterion of the selection criteria applied to each initial event depends on the identity of the entity of the plurality of entities associated therewith, and
       generate an updated schedule in the single calendar that includes the subset of the plurality of initial events and the plurality of subsequent events and does not include initial events of the plurality of initial events not included within the subset of the plurality of initial events.

11. The event system of claim 10 wherein the plurality of entities comprises a primary entity and a secondary entity.

12. The event system of claim 11 wherein each initial event of the subset of the plurality of initial events is associated with the primary entity.

13. The event system of claim 12 wherein all initial events of the plurality of initial events not included within the subset of the plurality of initial events are associated with the secondary entity.

14. The event system of claim 13 wherein a first entity of the pluralities of entities comprises a source of a first initial event of the plurality of initial events.

15. The event system of claim 14, wherein the processor is further configured to lock the first initial event so that the first initial event can only be modified by the first entity providing, to the processor, a first subsequent event comprising a modified version of the first initial event.

16. The event system of claim 14 wherein the source of the first initial event comprises a computer application that generated the first initial event.

17. The event system of claim 14 wherein the source of the first initial event comprises a user that generated the first initial event.

18. The event system of claim 10, the interface further configured to transfer the updated schedule to at least one entity of the plurality of entities.

19. A non-transitory computer readable medium having program instructions stored thereon for creating and updating schedules that, when executed by an event system, direct the event system to:
    receive a plurality of initial events associated with a plurality of entities;
    generate an initial schedule in a single calendar that includes the plurality of initial events;
    receive a plurality of subsequent events;
    apply, after receiving the plurality of subsequent events, selection criteria to each initial event of the plurality of initial events to identify a subset comprising all initial events of the plurality of initial events that satisfy the selection criteria and are, therefore, to be kept within the single calendar;
    wherein a consequence of at least one criterion of the selection criteria applied to each initial event depends on the identity of the entity of the plurality of entities associated therewith; and
    generate an updated schedule in the single calendar that includes the subset of the plurality of initial events and the plurality of subsequent events and does not include initial events of the plurality of initial events not included within the subset of the plurality of initial events.

* * * * *